May 27, 1969     H. C. MOLENAAR     3,445,881
RECIPROCATING PUMPS FOR USE WITH WINDSHIELD WASHERS
Filed April 3, 1967
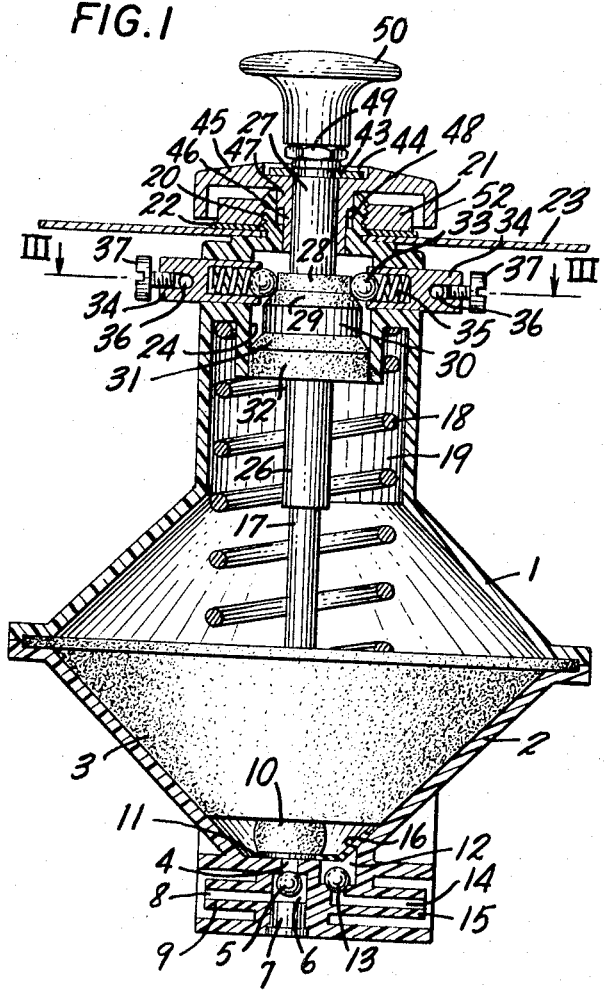
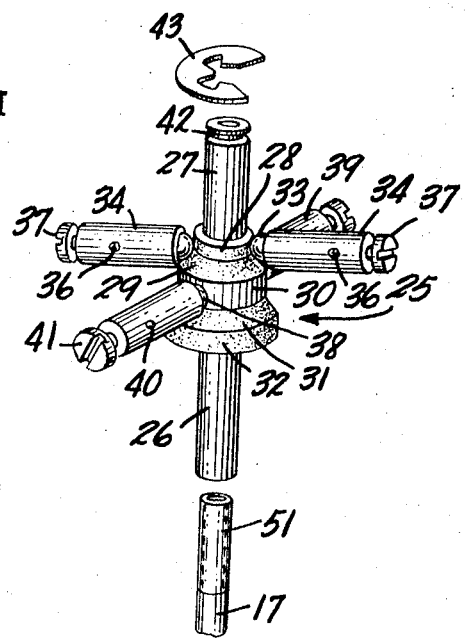
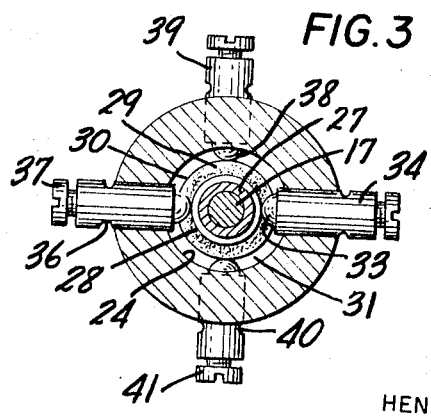
INVENTOR.
HENRI CHARLES MOLENAAR
BY
Brumbaugh, Graves, Donohue, + Raymond
his ATTORNEYS United States Patent Office 3,445,881
Patented May 27, 1969

3,445,881
RECIPROCATING PUMPS FOR USE WITH
WINDSHIELD WASHERS
Henri Charles Molenaar, Stevinstraat 177,
The Hague, Netherlands
Filed Apr. 3, 1967, Ser. No. 627,819
Claims priority, application Netherlands, Apr. 4, 1966,
6604455
Int. Cl. A47l 1/02; B60s 1/10; H01h 21/04
U.S. Cl. 15—250.02                                6 Claims

ABSTRACT OF THE DISCLOSURE

A windshield washer pump having contacts actuated first toward the end of its suction stroke to energize a windshield wiper motor and then towards the end of its discharge stroke to break one circuit and close another circuit in quick sequence for arresting the motor in a parking position of the wiper blades. The pump actuator carries a switch member having a contact element disposed between nonconductive sloping cam surfaces and slidable to engage selectively two pairs of circuit terminals to close one or the other of the two circuits. The circuit terminals are biased into engagement with said spring member and cooperate with its sloping cam surfaces to effect a snap action movement thereof towards the end of the pump discharge stroke to break the one circuit and close the other circuit in quick sequence.

Background of the invention

This invention relates to windshield washing units for automobiles. In particular, it relates to pump units which are actuatable to spray fluid onto the windshield of a vehicle and, at the same time, automatically control the operation of the windshield wiper or wipers of the vehicle so as to maintain them in operation long enough to clean the winshield thoroughly.

My prior Patent No. 3,039,127 discloses reciprocating pump apparatus of this type for use in a windshield cleaning system for automobiles which comprises a hollow casing provided with a pumping chamber therein and having movably mounted therein a pumping member for drawing cleaning liquid into and discharging liquid from the pumping chamber to conduit means for applying it to the windshield. Normally, spring means urges the pumping member to the end position of its discharge stroke, and means is provided responsive to movement of the pumping member as it approaches the end of its discharge stroke, for restricting discharge of liquid from the pumping chamber. The pumping member, as it approaches the end of its suction stroke, actuates switch means to energize a windshield wiper motor to wipe the area of the windshield to which the liquid is to be applied during the discharge stroke. As the pumping member approaches the end of the discharge stroke, it actuates switch means to deenergize the wiper motor.

A pump of the kind described above is adapted to act as a control for supplying electric current to an electric motor driving a windshield wiper when the pump is actuated and to maintain the supply of current during delivery of liquid to the windshield and subsequently for a predetermined period of time after the delivery of liquid to the windshield has ceased. The present invention is an improvement on apparatus of this character.

Summary of the invention

It is an object of the invention to provide improved apparatus of the above character in which a snap-action switching member is provided for interrupting the supply of electric current to an electric motor for driving a windshield wiper.

A further object of the invention is to provide improved pump apparatus of the above character which is adapted to control the supply of electric current to a windshield wiper motor requiring, in quick sequence, the opening of one circuit and the closing of another for arresting the motor in a parking position of the wiper blades.

The above and other objects of the invention are attained in accordance with the invention by providing, in pump apparatus of the type described above, a switch member coupled to the pumping member for movement therewith and having contact means slidable therewith into and out of engagement with spaced contacts urged resiliently into engagement with the switch member. Formed on the switch member adjacent said contact means are inwardly sloping cam surfaces which are adapted to cooperate with said spaced contacts to effect a snap-action movement of the switch member. The cam surfaces are made of electrically insulating material and are preferably frustoconical in shape.

For a specific embodiment, two pairs of spaced contacts are provided which are selectively engageable by the contact means on the switch member such that the contact means establishes an electrical connection between the contacts of one pair when the electrical connection between the contacts of the other pair has been ruptured. In this form of the invention, sloping cam surfaces may be provided above and below the contact means on the switch member to cooperate with the respective pairs of contacts to effect the desired snap-action movement of the switch member.

Brief description of the drawing

For a better understanding of the present invention reference may be made to the accompanying drawings in which:

FIG. 1 is a view in longitudinal section and partially broken away of a pumping unit in accordance with the invention, the pumping member occupying the end position of its discharge stroke;

FIG. 2 is an isometric view of the switching member and the contact members of the pumping unit shown in FIG. 1; and FIG. 3 is a view in cross-section taken along the lines III—III of FIG. 1, showing the relationship between the switch member and the spaced contacts engageable thereby.

Description of the preferred embodiment

The embodiment of the pump shown in the drawings and described hereinafter is intended to be interconnected with the battery and windshield wiper motor of an automobile, the pump being capable of functioning as a conventional switch for controlling the operation of the windshield wiper motor. The present embodiment of the pump is arranged to be used with a windshield wiper motor of the type requiring, in quick sequence, the opening of one circuit and the closing of another circuit in order to put it in operation or to bring it to rest with the blades in a predetermined rest position.

The pump disclosed in FIG. 1 comprises an upper pump casing section 1, a lower pump casing section 2, and a diaphragm 3 formed of a resilient material, such as rubber, which is within the lower pump casing section 2 and is clamped around its edge between the opposing edges of the facing pump casing sections. In order to simplify the structure and in particular the electrical connections described hereinafter, the casing sections may be formed of an insulating material, such as plastic or the like.

While it is possible to arrange a pump according to the invention so that the diaphragm 3 is moved to exert a suction stroke by means of a vacuum developed in the space between the casing section 1 and the diaphragm 3, the embodiment shown is arranged so that the diaphragm is adapted to be moved manually to draw liquid into the pumping chamber delimited by the casing section 2 and the diaphragm 3. The suction stroke of the diaphragm 3 is effected by means of an actuating stem 17 secured to the central part of the diaphragm in any suitable manner, for example, as shown in the aforesaid Patent No. 3,039,127, and a manually operable knob 50 which is threaded to the end of the stem 17 and extends outside the pump casing.

The stem 17 and the diaphragm 3 are normally urged inwardly by a compression spring 18 mounted within a spring chamber 19 forming an extension of the casing section 1. During a suction stroke of the diaphragm, the spring 18 is compressed and effects the subsequent discharge stroke of the diaphragm when the knob 50 is released.

During a suction stroke, washing liquid is drawn into the pumping chamber through a bore 14 of a connecting nipple 15 for a suction line to a source of washing liquid (not shown). When washing liquid is being drawn into the pumping chamber, an inlet ball valve 13 opens and is retained in a chamber 12 by a stop member 16 which may be a grating having openings therein to enable the liquid to pass through. During a discharge stroke, washing liquid drawn into the pumping chamber during the previous suction stroke is expelled therefrom through the outlet 4, an outlet valve chamber 6 for a ball valve 5 which is open at this time, and a bore 8 of a discharge nipple 9 for a discharge line leading to the windshield. One wall of the valve chamber 6 is formed by a stopper 7, which may be removed to enable the ball 5 to be removed and repositioned within the chamber 6 when the pump is assembled or repaired.

To effect a restricted discharge of washing liquid from the pumping chamber during the final part of the discharge stroke of the diaphragm 3, a resilient stopper member 10 is secured to the side thereof facing the pump chamber. The stopper 10 may be a cylindrical block of foam rubber provided with a disc 11 of impervious rubber on the surface thereof facing the outlet 4.

When the diaphragm 3 approaches the end of its discharge stroke, the disc 11 blocks the outlet opening 4 whereby the washing liquid ceases to be sprayed upon the windshield. However, a restricted discharge passage (not shown) is provided, for example, by taking steps to insure that the valve 13 when seated does not completely close the inlet passage. This passage permits the washing liquid still present in the pumping chamber when the outlet opening is blocked to be slowly discharged through the inlet passage and thus enables the discharge stroke of the pumping member to be completed. During this completion, the resilient stopper member 10 is compressed under the action of the spring 18. because the liquid still present in the pumping chamber after the outlet 4 has been closed by the disc 11 can escape only through a narrow passage, the speed of the diaphragm 3 is greatly decreased during the final part of the discharge stroke. During this final part of the discharge stroke, no liquid is squirted on the windshield of the atuomobile.

Mounted slidably on the pump actuating stem 17 is a switch member 25 which comprises a central portion carrying a contact ring 30 of electrically conductive material and tubular end portions 26 and 27. The contact ring 30 is adapted to establish selectively an electrical connection between a pair of diametrically opposed contact or brush members 33 or another electrical connection between a second pair of diametrically opposed contact or brush members 38. The contact or brush members 33 and 38 are preferably constituted by balls as shown.

The length of the contact ring 30 in the axial direction is less than the distance between the balls 33 and the balls 38 in the direction of movement of the diaphragm, so that an electrical connection between the balls 33 can be established only when the electrical connection between the balls 38 has been broken, or vice-versa.

The balls 33 are slidably mounted in terminals 34, respectively, fastened to the pump casing and are urged resiliently against the switch member 25 by means of compression springs 35, respectively. An opening 36 for a lead or conductor (not shown) is provided in each of the terminals 34, with a screw 37 to secure the lead or conductor in the opening 36. Similarly, the balls 38 (FIG. 3) are slidably mounted in the respective terminals 39 which have openings 40 and 41 to hold leads or conductors therein. The balls 38 are also resiliently urged against the switch member 25 by compression springs (not shown).

Between the electrically conducting contact ring 30 and the tubular end portions 26 and 27 are formed electrically insulating members for breaking the connections between the balls 33 and 38, respectively, depending upon the relative displacement between the switch member 25 and the pump casing. Thus, the connection between the balls 33 is adapted to be interrutped by a cylindrical, electrically insulating portion 28 of lesser diameter than the contact ring 30 which merges with a frustoconical, electrically insulating cam portion 29 extending to the contact ring 30 and having a base of substantially the same diameter as the latter.

Similarly, the connection between the balls 38 is adapted to be interrupted by a cylindrical, electrically insulating portion 32 of greater diameter than the contact ring 30 and a frustoconical, electrically insulating cam portion 31 which provides a sloping path from the contact ring 30 to the cylindrical portion 32. On displacement of the switch member 25, the cylindrical portion 32 is guided by the wall 24 of a chamber of the pump casing in which the switch member is accommodated.

In the position of the switch member 25 shown in FIGS. 1 and 2, an electrical connection is established between the pair of balls 38, and the connection between the balls 33 is broken.

The operating knob 50 is threaded on the end of stem 17 which is provided with screw threads 51, and can be locked in a desired position by means of lock nut 49.

The operation of the pump is as follows:

On pulling out the stem 17 by means of the knob 50, the central part of the diaphragm 3 abuts against the portion 26 of the tube as the end of the suction stroke is approached. As a result, the switch member 25 is moved into a position such that the conductive cylindrical portion 30 is located between the contacts 33, and the nonconductive cylindrical surface 32 is located between the contacts 38. When the switching member is in this position, power is applied through a circuit (not known) which is completed by the contacts 33 engaging the contact ring 30 to energize the electric motor driving the windshield wipers whereby the windshield wipers commence to operate.

During the greater part of the discharge stroke, the stem 17 slides within the tubular end portions 26, 27 of the switching member 25 so that the contact ring 30 maintains the connection between contacts 33, and the windshield wipers continue to operate, as the pump delivers washing liquid to the windshield.

When the discharge stroke is nearly completed, the disc 11 covers the outlet opening 4, preventing liquid from being sprayed onto the windshield. However, any liquid remaining in the pumping chamber is discharged at a slow rate through the restricted passage in the inlet valve 13 so that the discharge stroke is completed under the influence of the spring 18 at a greatly decreased speed. During the completion of the discharge stroke, the lock nut 49 engages the tubular end portion 27 of the switch member 25, forcing the latter to move inwardly with the stem 17 and diaphragm 3.

The contact ring 30 is so designed that when the circumferential line delimiting the cylindrical portion 32 from the conical portion 31 registers with the balls 38, the circumferential line delimiting the contact ring 30 from the conical portion 29 will be in registry with the pair of balls 33. At this instant, the pressure exerted upon the switch member 25 by the balls 33 and 38 under the influence of the springs in the terminals 34 and 39, respectively, in cooperation with the inward slopes of the cam portions 29 and 31, causes the switching member 25 to snap back rapidly to the position shown in FIG. 2.

This quick movement of the switch member 25 occurs before the diaphragm 3 has fully completed its discharge stroke with the result that the windshield wiper motor is arrested in a parking position of the wiper blades.

The lock nut 49 can be adjusted in the longitudinal direction of the stem 17 by rotating the knob 50 in order to vary the duration of the period in which the windshield wiper motor remains in operation after the pump has ceased to deliver washing liquid to the windshield.

The embodiment of the pump shown is arranged so that it may also be used as a conventional switch for operating the windshield wiper without actuating the pumping member. To this end, a portion of the pump casing section 1 is extended to form a neck 20 having an internal helicoidal thread 48, and an operating ring 45, slidable in the axial and rotational directions is integrally extended to form a bearing sleeve 46 around the tube 27. The ring 45 has a rim 52 with a rough external surface to facilitate its rotation by hand. A snap-on lock ring 43 is secured in a groove around the tubular end portion 27 of the switch member 25 and is accommodated in a recess 44 of the operating ring 45.

A plurality of cams 47, arranged on the sleeve 46, engage with the threaded surface 48 in such manner that the ring 45 moves axially when it is rotated. When rotated in one direction, the ring 45 moves away from the diaphragm and the switch member 25 is moved with it (because of the mechanical coupling therewith through the ring 45, the snap-on lock ring 43, and the groove 42) to a position such that the connection between the pair of balls 33 is established and the connection between the pair of balls 38 is broken. This occurs without any appreciable amount of liquid being drawn into the pumping chamber by the diaphragm 3. When the ring 45 is rotated in the opposite direction, the switch member 25 is returned to the position shown in FIG. 2 by means of the spring 18 and the lock nut 49.

The neck portion 20 of the pump casing section 1 also serves as a means by which the pump can be secured to the instrument panel 23 of an automobile with a nut 21 and a washer 22 in the conventional manner.

Because the stopper member 10, 11 is not lifted clear from the outlet 4 during rotation of the ring 45, the pump does not deliver any liquid to the windshield during manual operation of the ring 45 when the pump is used as a conventional switch for operating the windshield wiper.

I claim:
1. A windshield washer for cooperation with a windshield wiper having a driving motor, comprising
   a hollow casing having a pumping chamber therein,
   a pumping member movable in said casing for drawing liquid into and discharging liquid from said pumping chamber,
   a pair of electrical contacts on said casing for connecting said driving motor to a source of power,
   resilient means urging said contacts inwardly of said casing,
   a stem connected to and movable with said pumping member,
   an electrically conductive portion on and adjustable axially of said stem for engaging said contacts to connect said motor to said source,
   an electrically insulating portion movable with said electrically conductive portion for engaging said contacts to disconnect said motor from said source when the pumping member is near the end of its stroke, and
   a sloping portion extending between said electrically conductive and electrically insulating portions and adapted to cooperate with said inwardly urged contacts for producing a snap-action movement of said portions relative to said contacts during the discharge stroke of said pumping member.

2. A windshield washer as defined in claim 1 in which said electrically conductive portion is a ring-like contact, said electrically insulating portion is substantially cylindrical in shape and of different diameter than said ring-like contact,
   and said sloping portion is substantially frustoconical in shape and extends from said ring-like contact to said electrically insulating portion.

3. A windshield washer as defined in claim 2 together with
   a second pair of electrical contacts on said casing,
   adapted to be engaged by said electrically conductive portion for closing a circuit to arrest said windshield wiper with the blades thereof in a predetermined position,
   second resilient means urging said second pair of contacts inwardly of said casing,
   a second substantially cylindrical electrically insulating portion movable with and of greater diameter than said electrically conductive portion,
   said first electrically insulating portion being of lesser diameter than said electrically conductive portion,
   and a second sloping portion of substantially frustoconical shape extending between said second electrically insulating portion and said ring-like contact.

4. A windshield washer as defined in claim 3, in which the spacing between said first and second electrically insulating portions is greater than the axial length of said ring-like contact.

5. A windshield washer as defined in claim 1, together with means enabling adjustment of said electrically conductive and insulating portions relative to said contacts independently of said pumping member.

6. A windshield washer as defined in claim 3, in which the spacing between said first and second pairs of electrical contacts is greater than the axial length of said ring-like contact.

References Cited
UNITED STATES PATENTS

| 3,039,127 | 6/1962 | Molenaar | 15—250.02 |
| 3,100,906 | 8/1963 | Bock et al. | 15—250.02 |

FOREIGN PATENTS

| 1,202,331 | 7/1959 | France. |

PETER FELDMAN, *Primary Examiner.*

U.S. Cl. X.R.

103—150; 200—67, 83